(12) United States Patent
Grolig et al.

(10) Patent No.: US 7,011,858 B2
(45) Date of Patent: Mar. 14, 2006

(54) CONCERTINA-SHAPED CASING SUITABLE FOR EDIBLE MATERIALS

(75) Inventors: Gerhard Grolig, Moerfelden-Walldorf (DE); Martina Koenig, Wiesbaden (DE); Christian Auf Der Heide, Osnabrueck (DE); Dirk Auf Der Heide, Bers nbrueck (DE); Furg-Heinrich Kallweit, Osnabrueck (DE)

(73) Assignee: Kalle GmbH & Co. KG, Wiesbaden (DE)

( * ) Notice: Subject to any disclaimer, the term of this patent is extended or adjusted under 35 U.S.C. 154(b) by 122 days.

(21) Appl. No.: 09/963,513

(22) Filed: Sep. 27, 2001

(65) Prior Publication Data

US 2002/0039611 A1 Apr. 4, 2002

(30) Foreign Application Priority Data

Sep. 29, 2000 (DE) ................ 100 48 718

(51) Int. Cl.
*A22C 13/02* (2006.01)
(52) U.S. Cl. .............. 426/92; 426/105; 426/111; 426/129; 426/135; 206/802; 452/22; 452/27
(58) Field of Classification Search .......... 426/92, 426/105, 111, 129, 135, 315; 206/802; 452/22, 452/27
See application file for complete search history.

(56) References Cited

U.S. PATENT DOCUMENTS

| | | | |
|---|---|---|---|
| 3,882,252 A | * | 5/1975 | Winkler ............ 426/140 |
| 4,346,738 A | | 8/1982 | Martinek |
| 4,428,402 A | | 1/1984 | Kubo et al. |
| 4,535,506 A | | 8/1985 | Hendriks et al. |
| 4,551,370 A | * | 11/1985 | Nausedas ............ 428/34.8 |
| 4,764,031 A | * | 8/1988 | Hutschenreuter et al. ... 383/120 |
| 4,818,551 A | * | 4/1989 | Stall et al. ............ 426/420 |
| 5,131,883 A | * | 7/1992 | Hendriks et al. ........ 452/21 |
| 5,215,495 A | * | 6/1993 | Crevasse ............ 452/21 |
| 5,356,331 A | * | 10/1994 | Madrigal-Ocegueda ...... 452/32 |
| 5,709,068 A | * | 1/1998 | Bylenga ............ 53/449 |
| 5,928,737 A | * | 7/1999 | Hammer et al. ........ 428/34.8 |
| 5,928,738 A | | 7/1999 | Auf Der Heide et al. |
| 2002/0004088 A1 | | 1/2002 | Miller et al. |

FOREIGN PATENT DOCUMENTS

| | | |
|---|---|---|
| DE | 1 198 988 | 8/1965 |
| DE | 31 01 424 A1 | 9/1982 |
| DE | 19608001 | 9/1997 |
| DE | 198 09 936 A1 | 9/1998 |
| EP | 0 340 776 A1 * | 11/1989 |
| EP | 408 164 | 1/1991 |

(Continued)

*Primary Examiner*—Drew Becker
(74) *Attorney, Agent, or Firm*—Connolly Bove Lodge & Hutz LLP

(57) ABSTRACT

The present invention relates generally to a shirred concertina formed from a seamless, tubular foodstuff casing that is tied-off at one end, and has an outer surface provided with a coating or impregnation including a food additive. The tied-off end of the present casing is turned back inwardly, into the hollow cavity formed by the concertina. Concertinas of the present invention are particularly adapted for use with automatic sausage filling, portioning, and clipping machines.

17 Claims, 1 Drawing Sheet

FOREIGN PATENT DOCUMENTS

| | | |
|---|---|---|
| EP | 0 471 147 A1 | 2/1992 |
| EP | 0 986 957 A1 | 3/2000 |
| EP | 986 957 | 3/2000 |
| EP | 19625 094 A1 | 3/2000 |
| EP | 1 125 504 A1 | 8/2001 |
| JP | 51079748 A * | 7/1976 |
| JP | 406261673 * | 9/1994 |
| WO | WO 97-36798 | 10/1997 |
| WO | WO 98-31731 | 7/1998 |

* cited by examiner

CONCERTINA-SHAPED CASING SUITABLE FOR EDIBLE MATERIALS

BACKGROUND OF THE INVENTION

1. Field of the Invention

The present invention relates generally to a shirred concertina of a seamless, tubular casing for foodstuffs, that is capable of being tied off at one end, and has an outer surface that can be coated or impregnated with a material containing a food additive. A concertina of the present invention is particularly adapted for use with automatic sausage-filling, portioning, and clipping machines.

2. Description of Related Art

Tubular foodstuff casings can be shirred to permit them to be filled with sausage or other edible material in a single operational step, without interruption, along a linear unit. As such, it is possible to achieve a partially continuous mode of operation. When the shirring process is completed, approximately 30 to 100 m of tubular casing form a so-called concertina, (a generally accordion-shaped shirred casing), approximately 30 to 100 cm in length, depending, among other things, on the wall thickness of the casing. Ordinarily one end of the casing, which has been shirred in sections, is then closed off. Generally, clips made of plastic or metal have proven effective for closing off one end of the casing. The same result may be achieved with a simple tying-off.

Methods for turning unshirred tubular casings are known in the art. However, they require expensive equipment (see for example, DE 11 98 988 and DE 14 79 836), and are generally not necessary in producing or processing a concertina of the present invention. One process for simultaneously filling and turning of a tubular food casing involves coating the outer surface with a barrier layer to prevent oxygen and water vapor from permeating the casing (specifically a PVDC layer), as described for example in EP-A 004 620.

Also known-in-the-art are processes for coating or impregnating the outer or inner surfaces of tubular food casings, especially sausage casings, with liquid smoke. Application of such materials to the outer surface of casings is generally easier in terms of process engineering. However, components of the liquid smoke should generally pass through the casing in order to give a sausage product a typical color, aroma, and flavor of smoke. Cellulose casings impregnated with liquid smoke on their outer surface are widely known. Frequently, casings that do not include cellulose in a sufficient amount are not permeable enough to be treated with liquid smoke or the like. This is true of single-layer synthetic casings, and certainly of multilayer synthetic casings. In any case, such casings can be treated with liquid smoke on their inner surface. However, inner surface treatment may result in the liquid smoke not adhering sufficiently to the surface, and instead collecting forming droplets.

One approach to solving this problem is described, for example, in DE-A 196 08 001. The idea therein is to apply liquid smoke to a thin film that is cut to size and is then shaped to form a tube, with the side that is coated with the liquid smoke being turned inwardly. The tube is then permanently sealed via a heat-sealing process, leaving a longitudinal seam. The application of the liquid smoke and the production of the tube are completed just before the tube is filled with the sausage product. The sealed tube is not shirred. However, in the area around the seam, the liquid smoke components are not evenly applied. When the casing is peeled off, this unevenness becomes obvious as evidenced by spotting or uneven coloration on the surface of the sausage. Furthermore, because of the seam, the mechanical resistance of the casing is not great enough. Bacteria are able to work their way into the sausage product through defective points along the seam. In addition, because the sealed ends overlap, or are covered with a sealing strip, the casing thickness is not uniform throughout since the casing is thicker along the seam. A concertina produced from this type of casing would be uneven and thus difficult to process.

EP-A 986 957 describes seamless food casings based on synthetic materials provided on their inner surface with a layer containing a component that transfers a particular aroma, flavor, or color to the sausage product, emulsified in a binding agent. Binding agents considered particularly well-suited include alginates, methyl cellulose, hydroxymethyl cellulose, carboxymethyl cellulose, hydroxypropyl starches, chitosan, albumin, pectin, carrageenan, casein, and soy or wheat protein. Polysaccharides that are esterified with aliphatic dicarboxylic acid anhydrides or etherified with acrolein, epichlorohydrin, ethylene glycol, ethylene oxide, or similar compounds are also listed as being well suited. As aroma, flavoring, and/or coloring agents, spices (especially pepper), chicken flavoring, lemon oil, orange oil, honey, sorrel, cinnamon, and sugar (especially brown sugar) are mentioned. The food casings coated on their inner surface in this manner are intended for use with packaging cooked meat products. For example, are coated pouches for packaging cooked chicken breast. The pouches are sealed in a heat-sealing process. When heated a second time—for example in a microwave—the flavor, color, and aroma are transferred to the surface of the chicken breast.

In EP-A 408 164, a packaging material for foodstuffs is described. It comprises a waterproof carrier layer and a contact layer, to which herbs, spices, roe, fish paste, cheese, vegetable extracts, or similar foodstuffs, in the form of powder, granules, or chips, adhere. The contact layer is composed substantially of polysaccharides, such as starches, dextrin, acacia gum, sodium carboxymethyl cellulose, gelatins, or similar substances suitable for use in foodstuffs. The packaging material can be shaped to form a tube that is closed with a sealed seam. Such tubular food casings are used especially in the production of cooked ham. During the cooking process the spices or other food additives are transferred from the inner surface of the casing to the cooked ham.

In WO 97/36798, a heat-shrinking, flat, or tubular food casing is described, the inner surface of which comprises a layer of a copolymer and a food additive. The copolymer contains segments that are virtually insoluble in water, and hygroscopic. Pigments, aromas, flavorings, antioxidants, antimicrobials, enzymes, aroma-binding agents, and liquid smoke are listed as suitable food additives. These are at least partially transferred to the foodstuff contained in the casing.

A heat-shrinking foil is described in WO 98/31731. Where the inner coating thereof comprises a mixture of (i) an additive, composed of an aroma ingredient, a flavoring, a dye, an antimicrobial agent, a chelating agent, and/or an aroma-absorbing agent; (ii) a polysaccharide or protein as a binding agent; and (iii) a cross-linking agent, containing at least two carbonyl groups. The additive may be caramel, liquid smoke, paprika, benzoic acid, EDTA, tocopherol, sorbitol, or polyphosphate. Tubular films coated on the inner surface are then produced from the corresponding sheet films. The coating process is accomplished using a roller. During this process, the edges are not coated. The sheet film is then formed into a tube, and the overlapping edges of the film are securely sealed in a heat-sealing process. The casing } obtained in this manner is shirred, and closed at one end using a clip. The casing is then filled with a meat product and cooked. This causes the additive present in the inner coating of the casing to be transferred to the meat product. As explained above, tubular films having a sealed seam cannot be shirred into an evenly shaped concertina. Furthermore, a process described in WO 98/31731, wherein a seamless tubular film is produced, cut open, coated, and again sealed to form a tube, such a process is very costly and susceptible to problems. In addition, the food additives contained in the inner coating of the film are not always evenly transferred in the area around the sealed seam, because the edges of the film are left uncoated in order to prevent interference with the heat sealing process. Therefore, in many cases, there is an uneven distribution of inner coating (or even complete lack of coating) present in the areas around the seam. This becomes particularly problematic when highly pigmented additives, such as liquid smoke, are to be transferred.

SUMMARY OF THE INVENTION

It was thus an object of the invention to create a shirred concertina produced from a tubular casing, the outer surface of which is provided with a food additive, which can be processed such that the outer surface comes into contact with the filling. It was another object of the invention that any food additives included be evenly transferred to the sausage product. Furthermore, the casing should have no sealed seam, thus allowing it to be evenly shirred. Finally, it should be easy and inexpensive to produce.

In accordance with these and other objects, there is provided a shirred seamless, tubular concertina casing suitable for foodstuffs comprising: (i) an inner hollow cavity, (ii) two ends, one of which is tied off, wherein the tied-off end of the concertina is turned inward into the inner hollow cavity, and (iii) an outer surface provided with a coating or impregnation comprising a food additive.

Additional objects, features and advantages of the invention will be set forth in the description which follows, and in part, will be obvious from the description, or may be learned by practice of the invention. The objects, features and advantages of the invention may be realized and obtained by means of the instrumentalities and combination particularly pointed out in the appended claims.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

DETAILED DESCRIPTION OF THE PREFERRED EMBODIMENT

Figure 1:
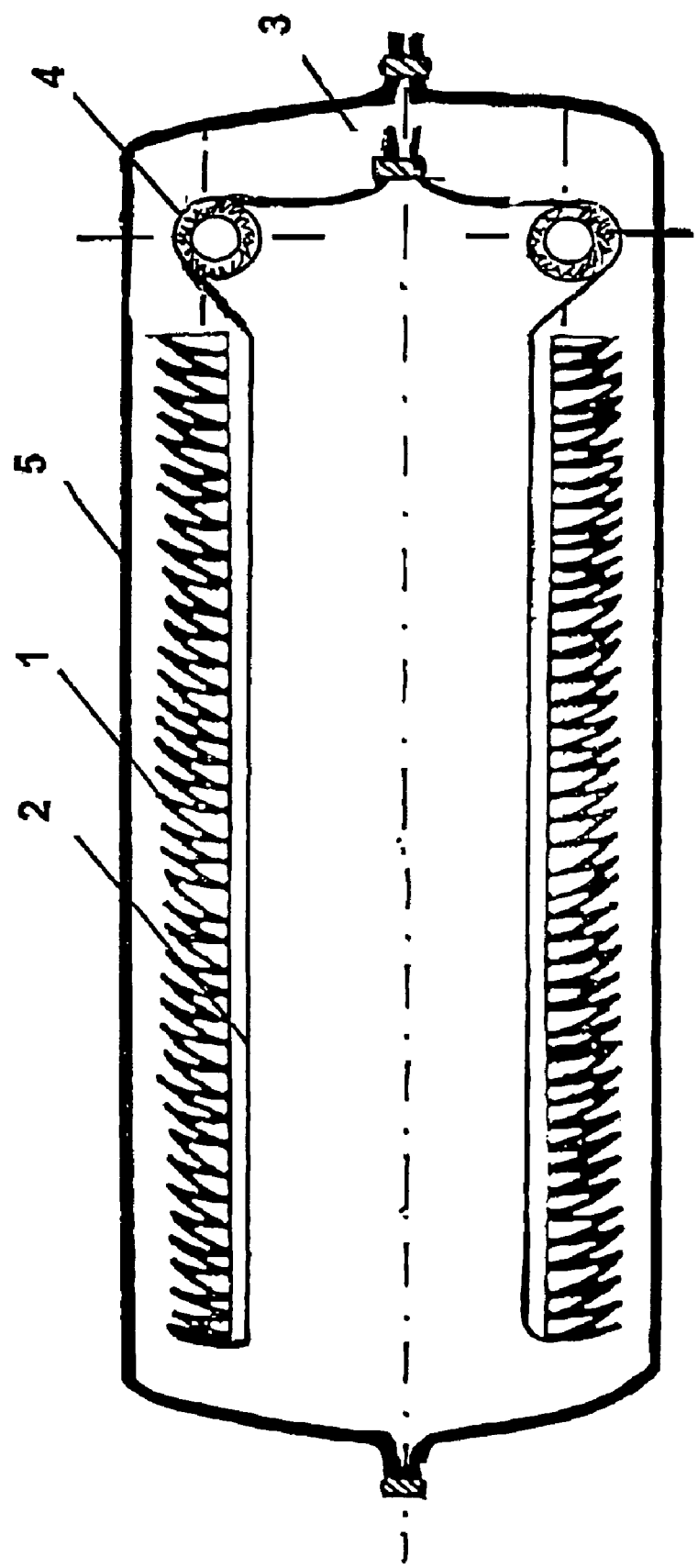
FIG. 1 shows a cross-section of a concertina-shaped casing for foodstuffs, as specified in the present invention.

Objects of the present invention can also be attained with a shirred concertina that can be produced by shirring a seamless, tubular casing provided with a coating on its outer surface. One end of the casing is tied off, and is inserted back through the hollow cavity (boring) in the concertina far enough that it reaches a filling device, specifically a filling horn. During the filling process the casing is then unshirred, and is simultaneously turned, so that the coating or impregnation containing the food additive which originally was on the outside is now on the inside.

The subject of the present invention is thus a shirred concertina composed of a seamless, tubular food casing that can be tied off at one end, the outer surface of which is provided with a coating or impregnation comprising a food additive. The shirred concertina is characterized in that the tied end is drawn back into the hollow cavity formed by the concertina.

The end of the concertina that is turned inward should preferably be the end that is eventually placed directly on a filling device. The unshirred or not yet shirred portion of the casing that is drawn inwardly, preferably extends over the entire length of the concertina. One end of the casing can be tied off with a clip (especially a plastic or metal clip), bound with thread, knotted, or tied off in any manner known in the art. The other end can be tied off after it has been drawn in, so that the clip does not become turned in as well.

The coating or impregnation applied to the outer surface comprises or contains at least one food additive. The food additive is generally designed to give the foodstuff a certain color, odor, aroma, and/or flavor. One specific example is a natural liquid smoke that may be present as an acid, and/or generally neutral or alkalized liquid smoke. Natural liquid smoke can be obtained for example, by dry heating or low-temperature coking of wood (especially hardwood, like hickory), and introducing the smoke created thereby into water. The natural liquid smoke obtained in this manner can be laced with substances that increase viscosity, natural or synthetic fats or oils (such as olive oil), alkaline substances, or other additives. In place of the liquid smoke, or in addition to it, optionally powdered smoke may be used. Powdered smoke is solid and can thus also be applied, for example, via a printing process, such as by Intaglio printing. In such a process, the powdered smoke is mixed with a binding agent beforehand. The binding agent should be safe for use with foods. Particularly well suited binding agents (binders) include polysaccharides (such as starches), esterified polysaccharides (especially esterified with dicarboxylic acid anhydrides, such as acetic anhydride, propionic acid anhydride, succinic acid anhydride, or maleic acid anhydride) or etherified polysaccharides, modified starches (such as hydroxypropyl starches, hydroxypropylmethyl starches, carboxymethyl starches), tragacanth gum, pectin, pullulan, xanthan gum, acacia gum, alginate, methyl cellulose, hydroxyethyl cellulose, hydroxypropyl cellulose, carboxymethyl cellulose, dextran, or chitosan, in addition to proteins or protein derivatives, especially casein, albumin, soy protein, wheat protein, whey protein, or gelatins. In many cases, it is advantageous to use mixtures of the above-named binding agents, especially mixtures containing a polysaccharide or a derivative thereof, and a protein or a protein derivative. By "protein" and "polysaccharide", it is intended all forms thereof including derivatives. Also suitable are binding agent mixtures that contain a polyvinylpyrrolidone and/or a copolymer containing vinylpyrrolidone units (the term "copolymer" refers here to polymers composed of two or more different monomer units), in addition to polysaccharide or protein. The above-named binding agents or binding agent mixtures can naturally also be used in an outer coating, mixed with other food additives. Other suitable optional food additives include, for example, natural or artificial flavors, dyes, fragrances, and spices.

It has further proven advantageous in some embodiments for the coating to contain a cross-linking agent, such as a (i) dienal (aldehyde having two carbon-carbon double bonds), preferably a long-chain (i.e. 6–15 carbon atoms) dienal such as citral (3,7-dimethyl-2,6-octadienal), (ii) tannic acid, (iii) caramel, or (iv) linseed oil. The cross-linking process causes the coating to exhibit a substantially improved coherency, so that it will generally not tear open under stress, and typically will not break or become otherwise damaged during the turning process. Furthermore, it may be favorable in some instances for the coating to contain agents that reduce the solubility of the coating in water. Suitable agents for this purpose include shellac, especially lamellar shellac. Finally, the coating may also contain other additives, especially silicon dioxide such as that sold as Aerosil®.

In a further preferred exemplary embodiment, the inside of the turned-in portion of the casing may contain a fill ring as shown, for example, in FIG. 1. A fill ring of the present invention is preferably designed to prevent the coating that is turned inward from being squeezed off, for example, by the casing-filling brake, or other apparatus used during a filling operation. Initially, this ring can be positioned adjacent to a first clip. The outer diameter of the fill ring corresponds approximately to the inner diameter of the casing. The fill ring is normally made of plastic, but could be formed of any other suitable material as desired. Furthermore, in accordance with some embodiments, shirred concertinas having a relatively large inner diameter (above 40 mm, preferably 100 mm or more) have proven particularly advantageous. In such concertinas, the distance between the fill tube and the inside of the concertina is greater than usual (greater than 4 mm). This helps ensure that the coating will not be damaged during the filling process.

For example, as shown in FIG. 1, one end of the shirred casing (1) is turned inward into the boring and is tied off with a clip (3), wherein the turned-in section (2) extends virtually along the entire length of the concertina. Also illustrated is the optional fill ring (4), as well as an optional canvas outer packaging (5).

In order to ensure that the turning concertina specified in the invention will hold its shape during transport and storage, it can be advantageously optionally provided with an outer packaging if desired. Suitable outer packaging includes a flexible canvas tube or an air- and/or water-tight film, or any other desired packaging. Because the coating that later will come into contact with the filling is still on the outside, for the most part, an impermeable film is a preferred outer packaging for hygienic reasons.

The seamless, tubular casing may be formed of any suitable material, such as regenerated cellulose. Cellulose casings may be produced in accordance with the generally known viscose process, and/or by extruding a solution of cellulose in aqueous N-methyl-morpholine-N-oxide (NMMO) through a tubular die. The NMMO process is also familiar in the industry. Any desired process may be employed.

If desired, the viscose casings may contain reinforcement provided by a flat, fibrous material, wherein hemp fiber paper is preferred in some embodiments. The viscose or NMMO/cellulose solution may optionally contain additives, such as alginic acid/alginate or copolymers containing units of methylvinyl ether and maleic acid and/or alkali maleate, which act as permanent (primary) softening agents, and serve to establish parameters that are useful for sausage casings, such as extensibility, flexibility, and/or permeability. These additives are preferably distributed homogeneously, for the most part, in the regenerated cellulose. Such casings are described, for example, in EP-A 460 348 (U.S. Pat. No. 5,096,754) or EP-A 757 892 (U.S. Pat. No. 5,811,162), the contents of which are incorporated herein by reference.

For the production of the shirred concertina described in the invention, seamless, tubular casings based upon thermoplastic starches, or mixtures containing thermoplastic starches and other natural or synthetic polymers, are also suitable. Such casings are also known in principle, for example, from EP-A 709 030 (U.S. Pat. No. 5,928,737), from WO 99/40797, or from WO 99/61524, the contents of which are incorporated herein by reference in their entireties.

A shirred concertina is particularly well suited, however, for foodstuff casings having barrier properties. These are casings largely or completely impermeable to water vapor, acid, and in some cases, food additives (such as liquid smoke). Generally, such barrier casings are made of synthetic materials. Suitable barrier casings may be single-layer, but often comprise several layers. These layers may be the same or different and can comprise, for example, aliphatic, partly aromatic, and/or fully aromatic polyamides or copolyamides (especially polyamide-6, polyamide-66, polyamide-9, polyamide-69, polyamide-612, polyamide-6I/6T, polyamide-MXD6), with the polyamide layers frequently containing still other polymers, such as polyester or polyolefin. In addition to or in place of polyamide layers, layers of polyolefin, especially polyolefins based upon ethylene, such as HDPE, LDPE, LLDPE, or based upon ethylene and ($C_3$–$C_8$) olefins, are also used extensively. Furthermore, such polymeric casings frequently contain barrier layers. Barrier layers may comprise, for example, ethylene/vinyl alcohol polymers (EVOH), of polyvinylidene chloride (PVDC), or of other polymeric materials. In addition, relatively thin (approximate thickness 0.5 to 5 $\mu$m) adhesive layers are frequently positioned between the individual layers. These are best composed of modified polyolefins, such as anhydride-modified ethylene/α-olefin copolymers. Additional layers of other synthetics may also be present if desired for any reason.

On the outer surface of synthetic (polymer) casings, as with the casings based on cellulose or starches, a binding agent layer may be provided, to which food additives will adhere, or into which such additives can optionally be incorporated. The binding agents are designed such that the layer(s) will adhere sufficiently to the surface, while ensuring that the additives will be released and allowed to reach the food.

For many applications, it has proven advantageous to stretch the tubular, synthetic casings longitudinally and transversally, and if desired also to heat-set them, partially or completely. After being cooked (for example, in 90° C. water for five minutes), they normally exhibit a longitudinal and transverse shrinkage of preferably not more than 20%, advantageously not more than 15%.

In one preferred exemplary embodiment, the casing itself already contains such a high water content, that additional soaking is not necessary. Suitable water contents are generally 25% or more based on the weight of the cellulose-based casing, advantageously from 30 to 40% by weight. Premoisturized polymer casings, such as polyamide casings, have a much lower water content (up to about 10% by weight). This is particularly important when the coating or impregnation applied to the outer surface contains water-soluble components (such as liquid smoke), or when components therein (such as peppercorns) could be washed away. Such "soak-free" casings based upon cellulose or synthetics are also known-in-the-art. In order to keep their relatively high water content constant, such casings are typically completely enclosed in moisture-proof packaging for transport and storage. Such packaging also serves to prevent microorganisms from entering the casings.

The tubular casings used to produce the turned concertina of the present invention preferably have a caliber of 30 to 200, most preferably 40 to 150 (corresponding to an inner diameter of 30 to 200 mm, preferably 40 to 150 mm). Their wall thickness generally is approximately 20 to 80 µm, preferably 35 to 60 µm. A turned concertina encompasses approximately 30 to 100 m of tubular casing, depending, among other things, upon the wall thickness and the caliber of the casing. The length of the shirred concertina casing is preferably 30 to 100 cm, more preferably 25 to 40 cm.

The outer coating advantageously comprises a mixture of at least one binding agent that is safe for use with foods, and at least one food additive. It is also possible for an optional contact layer to be applied to the casing, to which the food additives will be bound in a subsequent operational step. The latter exemplary embodiment is particularly well suited for food additives that are used in granular form, such as ground pepper, whole peppercorns, grated cheese, or other similar substances. These components should preferably adhere firmly enough to the contact layer so that they will not flake off to a large degree or at all during the turning process. On the other hand, they must also eventually be transferred to the food that is later provided in the casing, so that the adherence should not be too firm. The transfer of the additive to the food product takes place quite simply when the foodstuff inside the casing is heated or cooked.

As a binding agent (binder) for the contact layer, it is possible to include polysaccharides, such as starches, modified starches (such as carboxymethyl starches), dextran, pullulan, tragacanth gum, xanthan gum, acacia gum, alginate, methyl cellulose, hydroxyethyl cellulose, carboxymethyl cellulose, and gelatins are particularly well suited. The contact layer should advantageously be applied as thinly as possible, while remaining continuous; in other words it should be thick enough to coat the entire outer surface. The layer thickness should be designed to be compatible with the type of food additive that is to be applied.

Processes used in applying the coating to the outer surface of the tubular casing are generally known in the art. Suitable processes include coating, flocking, calendering, printing, and/or varnishing, and/or two or more processes could also optionally be used in combination. This is the case, for example, when a contact layer is produced by coating, and then the contact layer is flocked.

The shirred concertina specified in the invention can be used in packaging a multitude of foodstuffs, but is specifically adapted for use with sausage and meat products (such as cooked ham) and cheese.

The following example is used to describe the invention in greater detail. Percentages are by weight, unless otherwise indicated.

EXAMPLE 1

A seamless, tubular, multilayer polymeric casing comprising the layer sequence polyamide/polyethylene/polyamide, and having a caliber of 100 was coated on its outer surface with a mixture of 4% alginate
2% silicic acid
2% powdered smoke (Chardex M® from Red Arrow Co., Manitowoc, Wis., USA),
76% water and
16% natural, acid liquid smoke (Enviro 24 P® from Red Arrow Co.).

The mixture was applied using a squeegee, and was then dried. The casing was then shirred in sections to form a concertina. One end of the casing was tied off with a clip, and was pushed back through the hollow cavity in the concertina to its starting point. The open end of the concertina produced in this manner was placed upon an automatic sausage-filling and portioning machine, and was filled with sausage product. The turning of the casing during the filling step proceeded without problems. In the subsequent cooking of the sausage, the smoke color was transferred to the sausage product evenly and without spotting.

EXAMPLE 2

A seamless, tubular, three-layer polymer casing (layer sequence: polyamide/polyethylene/polyamide) having a caliber of 107 was coated on its outer surface with a mixture of 2.6% shellac,
3.0% polyvinyl pyrrolidone,
8.0% an alkali liquid smoke from Zesti Smoke,
1.6% a brown food dye (Eurolake Brown HT),
1.0% alginate (Protanal XLRB®),
0.2% citral, and
79.8% ethanol.

The coating was applied using a squeegee, and was dried. The coated casing was then further processed as described in Example 1.

EXAMPLE 3

A three-layer polymer casing of the same composition and caliber as described in Example 2 was coated on its outer surface with a mixture of 8.0% shellac,
7.0% an alkali liquid smoke from Zesti Smoke,
1.0% alginate,
1.0% silicon dioxide
0.1% citral,
1.0% a brown food dye (Eurolake Brown HT),
33.0% 4-% aqueous sodium hydroxide solution,
50.0% water (squeegee application). After drying, the coating was further processed as described in Example 1.

The casings produced in accordance with Examples 1 through 3 were then filled with sausage product using an automatic sausage-filling and portioning machine. In the cooking of the sausage that followed, the smoke color was transferred evenly and without spotting onto the sausage product, an effect which provide to the present invention, would have been completely unexpected.

Additional advantages, features and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined bye the appended claims and their equivalents.

The priority document, German Patent Application No. 100 48 7181, filed Sep. 29, 2000 is incorporated herein by reference in its entirety.

As used herein and in the following claims, articles such as "the", "a" and "an" can connote the singular or plural.

All documents referred to herein are specifically incorporated herein by reference in their entireties.

What is claimed is:

1. A shirred seamless, tubular concertina casing suitable for foodstuffs comprising:
    an inner cavity,
    two ends, one of which is tied off, wherein the tied-off end of the concertina is turned inward into the inner cavity, such that the tied-off end includes a closure placed on a turned-in section of said concertina, such that when said casing is filled, said concertina is turned inside out and said closure is on the outside thereof; and
    an outer surface provided with a coating or impregnation comprising a food additive, wherein said additive imparts a color, an odor, an aroma, and/or a flavor to said casing so as to enable even transfer of said additive to said foodstuffs, and further wherein the concertina casing is based upon thermoplastic starches of mixtures containing thermoplastic starches and other natural or synthetic polymers, and the concertina casing is single- or multilayer.

2. A shirred concertina casing in accordance with claim 1, wherein the turned-in part of the tied-off end of the casing extends over approximately an entire length of the concertina.

3. A shirred concertina casing in accordance with claim 1, wherein the coating or impregnation that is provided on the outer surface further comprises at least one binding agent.

4. A shirred concertina casing in accordance with claim 1, wherein the food additive comprises a natural liquid smoke, a neutral liquid smoke, or an alkali liquid smoke and/or powdered smoke.

5. A shirred concertina casing in accordance with claim 1, wherein the coating comprises a cross-linking agent.

6. A shirred concertina casing in accordance with claim 1, wherein the coating comprises a material tat is capable of reducing the water solubility of the coating.

7. A shirred concertina casing in accordance with claim 1, wherein the coating comprises a polyvinyl pyrrolidone and/or a copolymer containing vinylpyrrolidone units.

8. A shirred concertina casing in accordance with claim 1, wherein a fill ring is positioned inside the turned-in portion of the casing.

9. A shirred concertina casing in accordance with claim 1, wherein the concertina casing is enclosed in outer packaging.

10. A shirred concertina casing in accordance with claim 1, wherein the concertina casing further comprises fiber-reinforced, regenerated cellulose.

11. A shirred concertina casing in accordance with claim 1, wherein said casing is designed to be soak-free.

12. A shirred concertina casing in accordance with claim 3, wherein the binding agent comprises a polysaccharide or a derivative thereof, a protein or a derivative thereof, or a mixture of a polysaccharide and a protein.

13. A shirred concertina casing in accordance with claim 5, wherein the cross-linking agent comprises a long-chain dienal, tannin, caramel, and/or linseed oil.

14. A shirred concertina casing in accordance with claim 1, comprising polyamides and/or polyolefins.

15. A food product comprising a casing according to claim 1.

16. A concertina casing of claim 1, that has been filled wit an edible material.

17. A method for producing an edible material comprising:
    placing a shirred concertina casing of claim 1 on a filling apparatus, and
    filling said casing with edible material.

* * * * *